(12) United States Patent
Wei et al.

(10) Patent No.: US 12,614,105 B2
(45) Date of Patent: Apr. 28, 2026

(54) METHOD AND DEVICE FOR USE IN DATA PROCESSING, AND MEDIUM

(71) Applicant: NEC CORPORATION, Tokyo (JP)

(72) Inventors: Wenjuan Wei, Beijing (CN); Chunchen Liu, Beijing (CN); Lvye Cui, Beijing (CN); Lu Feng, Beijing (CN)

(73) Assignee: NEC CORPORATION, Tokyo (JP)

( * ) Notice: Subject to any disclaimer, the term of this patent is extended or adjusted under 35 U.S.C. 154(b) by 1169 days.

(21) Appl. No.: 17/605,731

(22) PCT Filed: Apr. 24, 2019

(86) PCT No.: PCT/CN2019/084049
§ 371 (c)(1),
(2) Date: Oct. 22, 2021

(87) PCT Pub. No.: WO2020/215237
PCT Pub. Date: Oct. 29, 2020

(65) Prior Publication Data
US 2022/0215291 A1 Jul. 7, 2022

(51) Int. Cl.
G06N 20/00 (2019.01)
G06N 5/022 (2023.01)
G06Q 50/00 (2024.01)

(52) U.S. Cl.
CPC ............. G06N 20/00 (2019.01); G06N 5/022 (2013.01)

(58) Field of Classification Search
USPC ........................................................ 706/12
See application file for complete search history.

(56) References Cited

U.S. PATENT DOCUMENTS

| | | | |
|---|---|---|---|
| 11,068,799 B2 * | 7/2021 | Chang .................... | G16B 40/00 |
| 2014/0280361 A1 | 9/2014 | Aliferis et al. | |
| 2019/0252036 A1 * | 8/2019 | Elemento .............. | G16C 20/30 |

FOREIGN PATENT DOCUMENTS

| | | |
|---|---|---|
| CN | 101436057 A | 5/2009 |
| CN | 103020423 A | 4/2013 |
| CN | 107491898 A | 12/2017 |

OTHER PUBLICATIONS

International Search Report for PCT/CN2019/084049 dated Dec. 19, 2019 (PCT/ISA/210).

(Continued)

*Primary Examiner* — David Yi
*Assistant Examiner* — Paul Coleman
(74) *Attorney, Agent, or Firm* — Sughrue Mion, PLLC

(57) ABSTRACT

Embodiments of the present disclosure relate to a method, device, and computer-readable storage medium for data processing. A method for data processing comprises obtaining a set of observed samples related to multiple factors, an observed sample in the set of observed samples comprising respective observed values of multiple factors. The method further comprises determining a set of dependency relationships between the multiple factors based on the set of observed samples, a dependency relationship in the set of dependency relationships indicating an interrelated factor pair among the multiple factors. The method further comprises determining a causality sequence of the multiple factors based on the set of dependency relationships, the causality sequence indicating that one factor is a cause of the other factor in the interrelated factor pair. Embodiments of the present disclosure further provide a device and computer-readable storage medium capable of performing the foregoing method.

19 Claims, 6 Drawing Sheets

(56) References Cited

OTHER PUBLICATIONS

Notification of Reasons for Refusal dated Apr. 4, 2023 from the Japanese Patent Office in application No. 2021-563019.

Hitoshi Afuso et al., "Genetic Causal Network Estimation from the Gene Expression Data", IPSJ SIG Technical Reports, Sep. 15, 2006, vol. 2006, No. 9 (2006-BIO-6), pp. 9-15 (10 total pages).

Wei Wenjuan et al., "Mixed Causal Structure Discovery with Application to Prescriptive Pricing", Proceedings of the Twenty-Seventh International Joint Conference on Artificial Intelligence, Jul. 2018, pp. 5126-5134 (10 total pages).

* cited by examiner

100

105

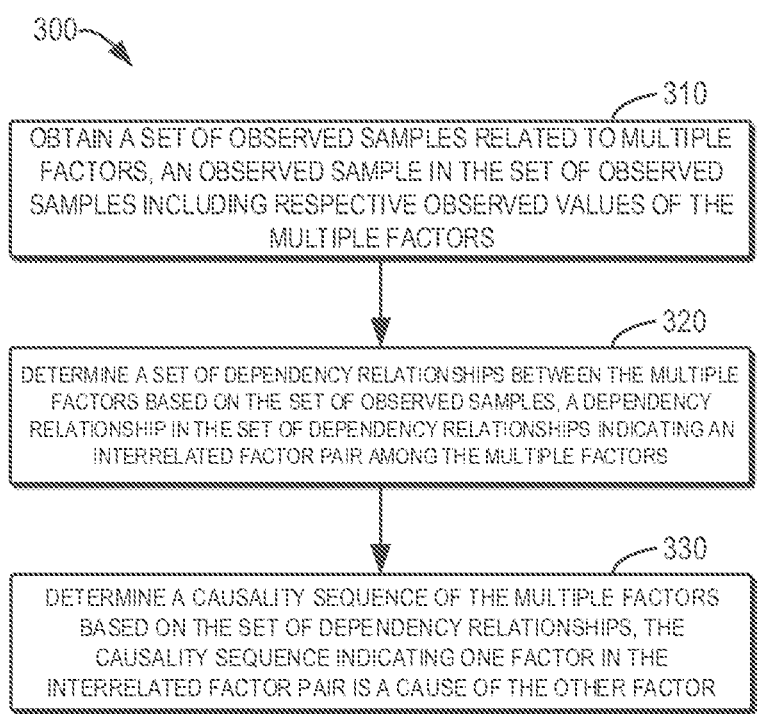

300

310

OBTAIN A SET OF OBSERVED SAMPLES RELATED TO MULTIPLE FACTORS, AN OBSERVED SAMPLE IN THE SET OF OBSERVED SAMPLES INCLUDING RESPECTIVE OBSERVED VALUES OF THE MULTIPLE FACTORS

320

DETERMINE A SET OF DEPENDENCY RELATIONSHIPS BETWEEN THE MULTIPLE FACTORS BASED ON THE SET OF OBSERVED SAMPLES, A DEPENDENCY RELATIONSHIP IN THE SET OF DEPENDENCY RELATIONSHIPS INDICATING AN INTERRELATED FACTOR PAIR AMONG THE MULTIPLE FACTORS

330

DETERMINE A CAUSALITY SEQUENCE OF THE MULTIPLE FACTORS BASED ON THE SET OF DEPENDENCY RELATIONSHIPS, THE CAUSALITY SEQUENCE INDICATING ONE FACTOR IN THE INTERRELATED FACTOR PAIR IS A CAUSE OF THE OTHER FACTOR

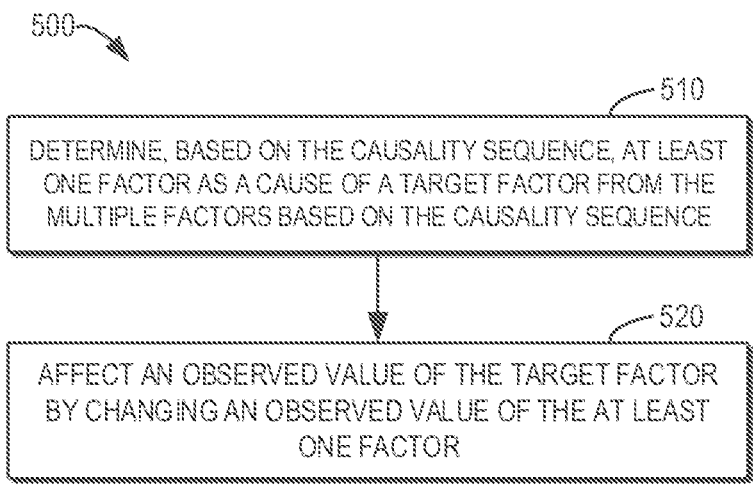

510

DETERMINE, BASED ON THE CAUSALITY SEQUENCE, AT LEAST ONE FACTOR AS A CAUSE OF A TARGET FACTOR FROM THE MULTIPLE FACTORS BASED ON THE CAUSALITY SEQUENCE

520

AFFECT AN OBSERVED VALUE OF THE TARGET FACTOR BY CHANGING AN OBSERVED VALUE OF THE AT LEAST ONE FACTOR

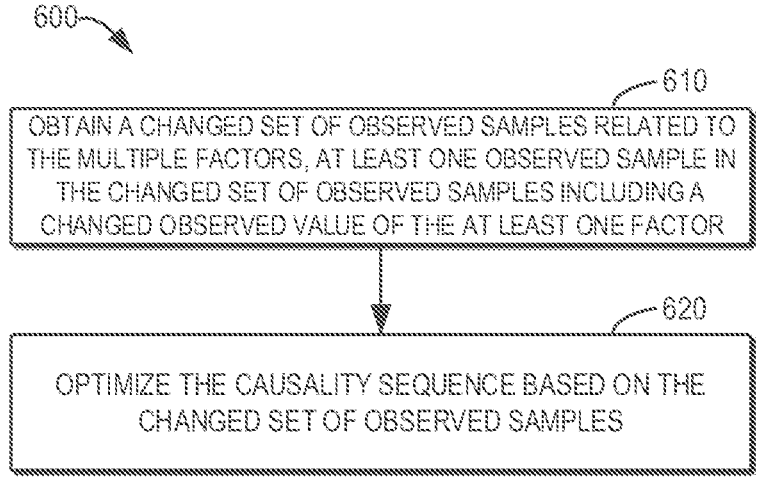

610

OBTAIN A CHANGED SET OF OBSERVED SAMPLES RELATED TO THE MULTIPLE FACTORS, AT LEAST ONE OBSERVED SAMPLE IN THE CHANGED SET OF OBSERVED SAMPLES INCLUDING A CHANGED OBSERVED VALUE OF THE AT LEAST ONE FACTOR

620

OPTIMIZE THE CAUSALITY SEQUENCE BASED ON THE CHANGED SET OF OBSERVED SAMPLES

FIG. 6

METHOD AND DEVICE FOR USE IN DATA PROCESSING, AND MEDIUM

CROSS REFERENCE TO RELATED APPLICATIONS

This application is a National Stage of International Application No. PCT/CN2019/084049 filed Apr. 24, 2019.

FIELD

Embodiments of the present disclosure generally relate to the field of machine learning, and more specifically, to a method, an apparatus, and a computer-readable storage medium for data processing.

BACKGROUND

With the fast development of information technology, the scale of data has grown rapidly. Under this background and trend, machine learning has received more and more attention. Causal discovery has a wide range of applications in real life, for example in the supply chain, healthcare and retail fields. The so-called causal discovery herein refers to discovering causality between multiple factors from sample data about the multiple factors. For example, in the retail field, results of causal discovery can be used to assist in formulating various sales policies; in the medical and health field, results of causal discovery can be used to assist in formulating treatment plans for patients, etc.

However, with the development of technology, the number of various factors that might have causality in a single system has increased significantly. In addition, people often focus on the linkage between different systems. These result in that the number of factors for which causality is to be discovered might be as high as hundreds or thousands. In this situation, it gets increasingly important to quickly and accurately discover causality between a large number of factors.

SUMMARY

Embodiments of the present disclosure provide a method, an apparatus, and a computer-readable storage medium for data processing.

In a first aspect of the present disclosure, provided is a method for data processing. The method includes: obtaining a set of observed samples related to multiple factors, each observed sample in the set of observed samples including respective observed values of the multiple factors; determining a set of dependency relationships between the multiple factors based on the set of observed samples, a dependency relationships in the set of dependency relationships indicating an interrelated factor pair between the multiple factors; and determining a causality sequence of the multiple factors based on the set of dependency relationships, the causality sequence indicating that one factor in the interrelated factor pair is a cause of the other factor in the interrelated factor pair.

In a second aspect of the present disclosure, provided is an apparatus for data processing. The apparatus includes: at least one processing unit; and at least one memory, coupled to the at least one processing unit and storing instructions executable by the at least one processing unit, the instructions, when executed by the at least one processing unit, causing the apparatus to perform acts including: obtaining a set of observed samples related to multiple factors, each observed sample in the set of observed samples including respective observed values of the multiple factors; determining a set of dependency relationships between the multiple factors based on the set of observed samples, a dependency relationships in the set of dependency relationships indicating an interrelated factor pair between the multiple factors; and determining a causality sequence of the multiple factors based on the set of dependency relationships, the causality sequence indicating that one factor in the interrelated factor pair is a cause of the other factor in the interrelated factor pair.

In a third aspect of the present disclosure, provided is a computer-readable storage medium. The computer-readable storage medium comprises machine-executable instructions stored thereon which, when being executed by a device, cause the device to perform a method according to the first aspect of the present disclosure.

This Summary is provided to introduce a selection of concepts in a simplified form that are further described below in the Detailed Description. This Summary is not intended to identify key features or essential features of the present disclosure, nor is it intended to be used to limit the scope of the present disclosure. Other features of the present disclosure will become easy to understand from the description below.

BRIEF DESCRIPTION OF THE DRAWINGS

Through the following disclosure and claims, the objects, advantages, and other features of the present invention will become more apparent. For the illustration purpose only, non-limiting description of preferable embodiments is provided with reference to the accompanying drawings, wherein:

FIG. 3 shows a flowchart of an example method according to embodiments of the present disclosure;

FIG. 5 shows a flowchart of an example method according to embodiments of the present disclosure;

FIG. 6 shows a flowchart of an example method according to embodiments of the present disclosure.

Throughout the figures, same or corresponding elements are indicated by same reference numerals.

DETAILED DESCRIPTION OF EMBODIMENTS

Figure 1A:
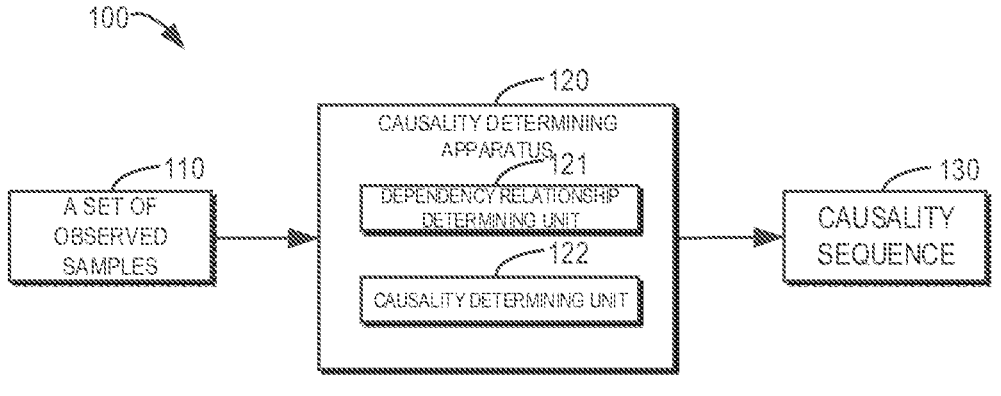
FIGS. 1A and 1B each show a block diagram of an example system for data processing according to embodiments of the present disclosure.

The embodiments will be described in more detail with reference to the accompanying drawings, in which some embodiments of the present disclosure have been illustrated. However, it should be understood that, the present disclosure can be implemented in various manners, and thus should not be construed to be limited to embodiments disclosed herein. On the contrary, those embodiments are provided for the thoroughly and completely understanding of the present disclosure. It should be understood that the drawings and embodiments of the present disclosure are only used for illustrative purposes only, and are not intended to limit the scope of the present disclosure.

In the description of the embodiments of the present disclosure, the term "includes" and its variants are to be read as open-ended terms that mean "includes, but is not limited to." The term "based on" is to be read as "based at least in part on". The term "one embodiment" or "the embodiment" is to be read as "at least one embodiment." The terms "first," "second", and the like may be used to refer to different or same objects. Other definitions, explicit and implicit, may be included below.

In the embodiments of the present disclosure, the term "causal structure" generally refers to the structure describing causality between various factors in a system, and is also referred to as "causality sequence" herein. The term "factor" is also referred to as "variable". The term "observed sample" refers to a set of observed values of multiple factors which can be directly observed, wherein a factor which can be directly observed is also referred to as an "observed variable".

As described above, in real life, it is desirable to quickly and accurately discover causality between a large number of observed variables.

In the field of customer service, in order to determine which factors affect customer satisfaction with telecom operators, a large number of customer consumption behavior data (such as customer level, consumption of Internet traffic per month, ratio of free traffic, total cost of Internet traffic usage per month, etc.), satisfaction survey data and operator policy data can be collected. Each collected type of data is also referred to as an observed value of a factor (or variable). By discovering causality between these factors, it is possible to determine one or more factors that affect customer satisfaction. Further, it is possible to improve customer satisfaction with telecom operators by changing observed values of the one or more factors or formulating a corresponding policy for the one or more factors.

In the health field, in order to determine factors affecting the blood pressure of a patient, a series of physiological indicators (i.e., observed values of a series of factors) of a large number of patients can be collected, such as heart rate, cardiac output, allergy indicators, total peripheral vascular resistance, catecholamine release, blood pressure, etc. By discovering causality between these physiological indicators, it is possible to determine a physiological indicator (i.e., factor) that affects the blood pressure of the patient. Further, it is possible to keep the blood pressure of the patient stable by affecting the physiological indicator or formulating a corresponding policy for the physiological indicator.

In the field of commodity sales, in order to determine factors affecting the sales of a target commodity (for example, umbrellas), external factor data (such as weather, season, temperature, date, scale of the store, etc.), sales data of the commodity (such as the sales volume of the commodity, the price of the commodity, etc.) and sales data of one or more related commodities (for example, ice cream) can be collected. By discovering causality between these factors, it is possible to determine one or more factors that affect the sales of the target commodity. Further, it is possible to increase the sales of the target commodity by changing observed values of the one or more factors or formulating a corresponding policy for the one or more factors.

In the field of software development, in order to determine factors affecting the failure rate and/or the software development cycle, information on various factors of software development can be collected, including but not limited to overall information on software development (such as development cycle, resources invested in development, etc.) and information about various phases of software development. The information about various phases of software development may include, for example, information about the architecture phase (such as software architecture method, the number of software architecture level, etc.), information about the coding phase (such as code length, number of functions, programming language, the number of modules, etc.), information about the testing phase (such as the correct rate or failure rate of unit testing, the correct rate or failure rate of black box testing, the correct rate or failure rate of white box testing, etc.), the information about the running phase after the software is released (such as the correct rate or failure rate of the running phase, etc.) Each collected type of data is used as an observed value of a factor. By discovering causality between these factors, it is possible to determine one or more factors that affect the software development cycle and/or failure rate. Further, it is possible to reduce the software development cycle and/or failure rate by changing observed values of the one or more factors or formulating a corresponding policy for the one or more factors.

Some conventional solutions mainly focus on the system that has a few features (at most 100 features), and employs constraint-based methods or score-based methods to search the whole space to detect possible causality. For example, in the constraint-based methods, the causal structure is found usually by applying a conditional independent test to multiple factors. However, when the number of factors that need to be searched is large, the conditional independent test becomes unreliable. In addition, the causal structure discovery usually needs to test the dependency relationship of any two factors with a conditional set arranging from including no factors to including all other factors, which causes huge computational overhead. In the score-based methods, the causal structure is usually discovered by optimizing a fitness score that measures how well the causal structure fits the sample data. However, these solutions are difficult to scale up to causal structures (also referred to as "high dimensional causal structures") for many (hundreds of) factors due to a super-exponential growth of the search space.

According to embodiments of the present disclosure, a solution is proposed for data processing. The solution can quickly and accurately realize the high dimensional causal structure discovery, so as to solve the above-mentioned and/or other potential problems. Detailed description is presented below to various embodiments of the present disclosure in conjunction with the above example scenarios. It should be understood this is merely for the illustration purpose and not intended to limit the scope of the present invention in any manner.

FIG. 1A shows an example block diagram of a system 100 for data processing according to embodiments of the present disclosure. The system may discover causality between multiple factors. It should be understood that the system 100 shown in FIG. 1A is merely an example that embodiments of the present disclosure may be implemented, but is not intended to limit the scope of the present disclosure. Embodiments of the present disclosure are also applicable to other systems or architectures.

As shown in FIG. 1A, the system 100 may include a causality determining apparatus 120. The causality determining apparatus 120 may receive a set of observed samples 110 related to multiple factors and determine a causality sequence 130 indicating causality between the multiple factors. Alternatively, in some embodiments, the system 100 may further include an observed sample collecting apparatus (not shown in FIG. 1A) for collecting the set of observed samples 110 related to multiple factors. The observed sample collecting apparatus may collect observed values of the multiple factors in real time, either regularly or irregularly, so as to obtain the set of observed samples 110. In some embodiments, the observed sample collecting apparatus may include one or more collecting units for collecting observed values of different types of factors, respectively.

The set of observed samples 110 may include observed samples of multiple factors related to one or more target factors. For example, the set of observed samples 110 may be denoted as $X=\{x_1, x_2, \ldots, x_D\}\square R^{N\times D}$, wherein N denotes the total number of observed samples in the set of observed samples 110, D denotes the total number of factors, and each observed sample in the set of observed samples 110 includes a group of observed values of D factors. A set of D factors is also denoted as $V=\{v_1, v_2, \ldots, v_D\}$, and $v_i$ (wherein $1\leq i\leq D$) denotes the i-th factor between D factors herein. Vector $x_i \square R^N$ (wherein $1\leq i\leq D$) denotes the N-th observed value of the i-th factor. For example, $x_{i,n}$ (wherein $1\leq i\leq D$ and $1\leq n\leq N$) denotes the n-th observed value of the i-th factor.

Take the above-mentioned scenario of customer satisfaction with telecom operators as an example. The target factor is "customer satisfaction", the set of factors V may include one or more of the following factors: factors related to customer attributes (such as customer level, customer number, etc.), factors related to customer behavior (such as consumption of Internet traffic per month, ratio of free traffic, total cost of Internet traffic usage per month, etc.), factors related to customer feedback (such as number of complaints, customer satisfaction, etc.), and policy factors formulated for customers (such as the number of over-package reminders, the timing of over-package reminders, etc.). By taking the factor of "customer level" (i.e., $v_i$) for example, the vector $x_i$ may be composed of levels of N customers, and $x_{i,n}$ may denote the level of the n-th customer between N customers. By taking the factor of "consumption of Internet traffic per month" (i.e., $v_i$) for example, the vector $x_i$ may be composed of consumption of Internet traffic per month of N customers, and $x_{i,n}$ may denote the consumption of Internet traffic per month of the n-th customer among N customers. The causality sequence 130 may for example, indicate causality between customer level, consumption of Internet traffic per month, ratio of free traffic, total cost of Internet traffic usage per month, customer satisfaction and other factors. For example, which factors are the causal factors for the target factor of "customer satisfaction".

Take the above-mentioned scenario of the blood pressure of a patient as an example. The target factor is "blood pressure", the set of factors V may include heart rate, cardiac output, allergy indicators, total peripheral vascular resistance, catecholamine release, blood pressure, etc. By taking the factor of "heart rate" (i.e., $v_i$) for example, the vector $x_i$ may be composed of heart rates of N patients, and $x_{i,n}$ may denote the heart rate of the n-th patient among N patients. By taking the factor of "cardiac output" (i.e., $v_i$) for example, the vector $x_i$ may be composed of cardiac outputs of N patients, and $x_{i,n}$ may denote the cardiac output of the n-th patient among N patients. The causality sequence 130 may, for example, indicate causality between heart rate, cardiac output, allergy indicators, total peripheral vascular resistance, catecholamine release, blood pressure and other factors. For example, which factors are the causal factors for the target factor of "blood pressure".

Take the above-mentioned scenario of commodity sales as an example. The target factor is "sales of a target commodity", the set of factors V may include one or more of the following factors: external factors (such as weather, season, temperature, date, scale of the store, etc.), factors (such as the sales volume of the target commodity, the price of the target commodity, etc.) related to sales behavior of the target commodity (for example, umbrellas), factors (such as the sales volume of the related commodity, the price of the related commodity, etc.) related to sales behavior of one or more related commodities (for example, ice cream), and sales policy factors (such as the number of promotions, frequency of promotions, etc.) for the target commodity. By taking the factor of "temperature" (i.e., $v_i$) for example, the vector $x_i$ may be composed of temperature of N days, and $x_{i,n}$ may denote the temperature of the n-th day. By taking the factor of "the sales volume of the target commodity" (i.e., $v_i$) for example, the vector $x_i$ may be composed of umbrella sales volumes of N days, and $x_{i,n}$ may denote the umbrella sales volume of the n-th day. The causality sequence 130, for example, may indicate causality between weather, season, temperature, date, scale of the store, the sales volume of the target commodity, the price of the target commodity, the sales volume of the related commodity, the price of the related commodity and other factors. For example, which factors are the causal factors for the target factor of "the sales volume of the target commodity".

Take the above-mentioned scenario of software development as an example. The target factor is "software development cycle" or "failure rate of software running phase", the set of factors V may include one or more of overall factors on software development (such as development cycle, resources invested in development, etc.) and factors about various phases of software development. Factors about various phases of software development may include: for example, factors about the architecture phase (such as software architecture method, the number of software architecture level, etc.), factors about the coding phase (such as code length, the number of functions, programming language, the number of modules, etc.), factors about the testing phase (such as the correct rate or failure rate of unit testing, the correct rate or failure rate of black box testing, the correct rate or failure rate of white box testing, etc.), and factors about the running phase after the software is released (such as the correct rate or failure rate of the running phase, etc.). By taking the factor of "development cycle" (i.e., $v_i$) for example, the vector $x_i$ may be composed of development cycles of N software products, and $x_{i,n}$ may denote the development cycle of the n-th software product. By taking the factor of "code length" (i.e., $v_i$) for example, the vector $x_i$ may be composed of code lengths of N software products, and $x_{i,n}$ may denote the code length of the n-th software product. The causality sequence 130, for example, may indicate causality between software development cycle, resources invested in development, architecture method, the number of architecture level, code length, the number of functions, programming language, the number of modules, the correct rate or failure rate of unit testing, the correct rate or failure rate of black box testing, the correct rate or failure rate of white box testing, the correct rate or failure rate of the running phase and other factors. For example, which factors are causal factors for the target factor of "development cycle", and which factors are causal factors for the target factor of "failure rate of the running phase".

As shown in FIG. 1A, the causality determining apparatus 120 may include, for example, a dependency relationships determining unit 121 and a causality determining unit 122.

In some embodiments, the dependency relationships determining unit 121 may determine a set of dependency relationships between the multiple factors based on the set of observed samples 110. Each dependency relationships in the set of dependency relationships indicates a respective inter-related factor pair among the multiple factors. In some embodiments, the causality determining unit 122 may determine the causality sequence 130 based on the set of dependency relationships determined by the dependency relationships determining unit 121. The causality sequence 130 may indicate causality (i.e., one factor is the cause of the other factor) between a factor pair having a dependency relationship.

It should be understood that these apparatuses and/or units in the apparatuses in the system 100 are merely exemplary and not intended to limit the scope of the present disclosure. It should be understood that the system 100 may further include an additional apparatus and/or unit which is not shown. For example, in some embodiments, the system 100 may further include a causality presenting apparatus (not shown) for presenting a representation of the causality sequence 130.

In some embodiments, the causality presenting apparatus may present the representation of the causality sequence 130 in visual, auditory or different ways. For example, the causality presenting apparatus may present the causality sequence 130 in graph, chart, text and other ways. In some embodiments, the causality presenting apparatus may present a presentation of the entirety of the causality sequence 130, that is, causalities between all factors. Alternatively, in some embodiments, the causality presenting apparatus may only present a representation of part of the causality sequence 130, e.g., causalities related to one or more target factors. In some embodiments, when the cause of the target factor includes multiple factors, the causality presenting apparatus may further present respective importance degrees of the multiple factors, e.g., present respective importance degrees of the multiple factors in different colors and/or numerical values representing different importance degrees. The embodiments of the present disclosure are not limited in this regard.

Figure 1B:
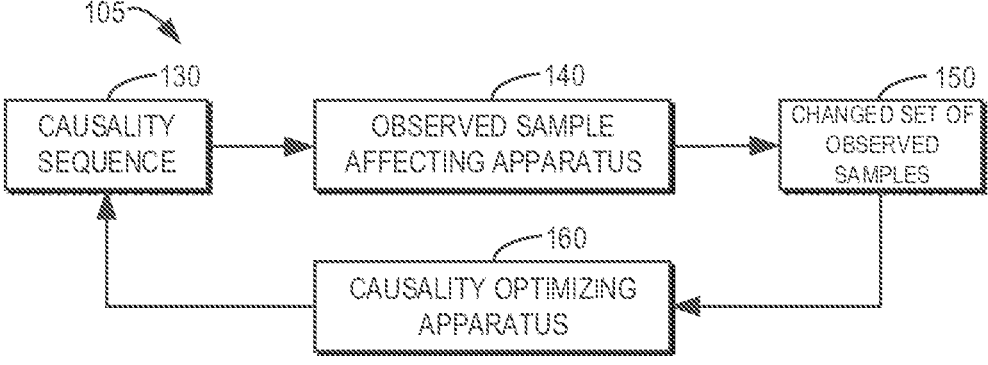

FIG. 1B shows an example block diagram of a system 105 for data processing according to embodiments of the present disclosure. The system 105 may, for example, apply and optimize the causality sequence 130 as shown in FIG. 1A. It should be understood that the system 105 shown in FIG. 1B is merely an example that embodiments may be implemented, but is not intended to limit the scope of the present disclosure. Embodiments of the present disclosure are also applicable to other systems or architectures.

As shown in FIG. 1B, the system 105 may include an observed sample affecting apparatus 140. The observed sample affecting apparatus 140 may determine at least one factor as a cause of a target factor from multiple factors based on the causality sequence 130. The observed sample affecting apparatus 140 may affect an observed value of the target factor by changing an observed value of the at least one factor, thereby obtaining a changed set of observed samples 150. At least one observed sample in the changed set of observed samples 150 includes a changed observed value of the at least one factor.

Take the above-mentioned scenario of customer satisfaction with telecom operators as an example. The target factor is "customer satisfaction", and the causality sequence 130 may indicate which factors are the cause factors for the target factor of "customer satisfaction", for example, the reminder before the package runs out, the reminder of preferential package, etc. The observed sample affecting apparatus 140 may improve customer satisfaction with telecom operators by affecting and changing observed values of these factors and/or formulating corresponding policies for these factors, for example, providing more reminders to customers before the package runs out, providing more favorable packages to customers.

Take the above-mentioned scenario of the blood pressure of a patient as an example. The target factor is "blood pressure", and the causality sequence 130 may, for example, indicate which physiological indicators are the cause factors for the target factor of "blood pressure". The observed sample affecting apparatus 140 may keep the blood pressure of the patient stable by affecting and changing these physiological indicators and/or formulating corresponding policies for these physiological indicators.

Take the above-mentioned scenario of commodity sales as an example. The target factor is "sales volume of umbrellas", and the causality sequence 130 may, for example, indicate which factors are the cause factors for the target factor of "sales volume of umbrellas", for example, weather, the number of umbrellas available for sale. The observed sample affecting apparatus 140 may increase the sales volume of the target commodity umbrellas by affecting and changing these factors and/or formulating corresponding policies for these factors, e.g., increasing the number of umbrellas available for sale during raining.

Take the above-mentioned scenario of software development as an example. The target factor is "software development cycle", and the causality sequence 130 may, for example, indicate which factors are the cause factors for the target factor of "development cycle", for example, the number of architecture level, programming language, etc. The observed sample affecting apparatus 140 may reduce the software development cycle by affecting and changing these factors and/or formulating corresponding policies for these factors, for example, reducing the software architecture complexity, using more-friendly programming language, etc. For another example, the target factor may be "software failure rate of running phase", and the causality sequence 130 may, for example, indicate which factors are the cause factors for the target factor of "software failure rate of running phase", for example, code length, the number of modules, etc. The observed sample affecting apparatus 140 may reduce the software failure rate of running phase by affecting and changing these factors and/or formulating corresponding policies for these factors, for example, reducing the code length, reducing the number of modules, etc.

As shown in FIG. 1B, the system 105 may comprise a causality optimizing apparatus 160. The causality optimizing apparatus 160 may optimize the causality sequence 130 based on the changed set of observed samples 150, thereby improving the accuracy of the causality sequence 130. In some embodiments, the causality optimizing apparatus 160 may re-discover causalities between the multiple factors based on the changed set of observed samples 150, for example, by implementing similar processes performed by the causality determining apparatus 120, thereby obtaining an optimized causality sequence. In this way, the embodiments of the present disclosure can further improve the accuracy and robustness of causal discovery.

Although the causality determining apparatus 120 as shown in FIG. 1A, the observed sample affecting apparatus 140 and the causality optimizing apparatus 160 as shown in Fig. B are shown as separate from each other, it should be understood that, this is merely for the illustration purpose and not intended to limit the scope of the present disclosure.

In some embodiments, the causality determining apparatus 120 as shown in FIG. 1A, the observed sample affecting apparatus 140 and the causality optimizing apparatus 160 as shown in Fig. B may be implemented in a single physical device or in multiple different physical devices. In some embodiments, the causality determining apparatus 120 as shown in FIG. 1A, the observed sample affecting apparatus 140 and the causality optimizing apparatus 160 as shown in Fig. B may be implemented as same apparatus. The embodiments of the present disclosure are not limited in this regard.

Figure 2:
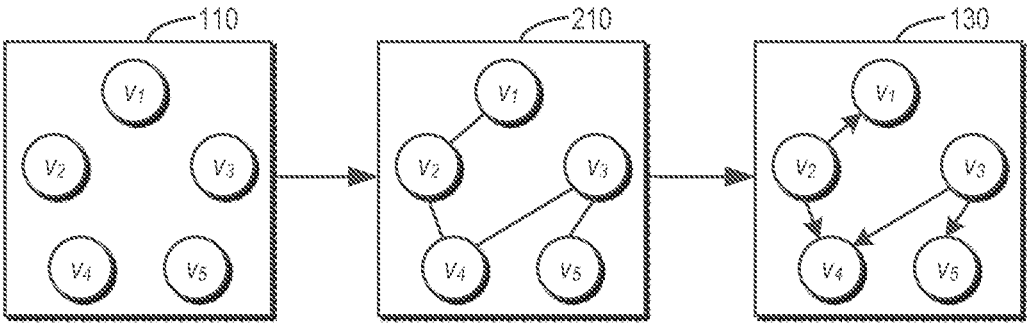
FIG. 2 shows a schematic view for determining causality between multiple factors according to embodiments of the present disclosure.

FIG. 2 shows a schematic view for determining causality between multiple factors according to embodiments of the present disclosure. For purposes of brevity and facilitating explanation, it is assumed that the number (i.e., D) of factors (i.e., observed variables) related to the set of observed samples 110 in FIG. 2 is 5. As shown in FIG. 2, the set of observed samples 110 includes multiple observed samples related to factors $v_1$, $v_2$, $v_3$, $v_4$, and $v_5$. The dependency relationships determining unit 121 may determine a set of dependency relationships between the factors $v_1$, $v_2$, $v_3$, $v_4$, and $v_5$ based on the set of observed samples 110, wherein the set of dependency relationships being represented as a skeleton graph 210. For example, the set of dependency relationships 210 indicates that the factors $v_i$ and $v_2$ are interrelated, factors $v_2$ and $v_4$ are interrelated, factors $v_3$ and $v_4$ are interrelated, and factors $v_3$ and $v_5$ are interrelated. The causality determining unit 122 may determine a causality sequence of the factors $v_1$, $v_2$, $v_3$, $v_4$, and $v_5$ based on the set of dependency relationships 210. In some embodiments, the causality sequence may be represented as a directed acyclic graph 130. For example, the causality sequence 130 indicates that the factor $v_2$ is a cause of the factor $v_i$ (as shown by edge $v_2{\rightarrow}v_1$), the factor $v_2$ is a cause of the factor $v_4$ (as shown by edge $v_2{\rightarrow}v_4$), the factor $v_3$ is a cause of the factor $v_4$ (as shown by edge $v_3{\rightarrow}v_4$), and the factor $v_3$ is a cause of the factor $v_5$ (as shown by edge $v_3{\rightarrow}v_5$).

FIG. 3 shows a flowchart of a method 300 for determining causality between multiple factors according to the embodiments of the present disclosure. For example, the method 300 may be performed by the causality determining apparatus 120 as shown in FIG. 1A. It should be understood that, the method 300 may further include an additional act which is not shown and/or may omit some acts which are shown. The scope of the present disclosure is not limited in this regard.

At block 310, the causality determining apparatus 120 obtains a set of observed samples (e.g., the set of observed samples 110 as shown in FIG. 1A and FIG. 2) related to multiple factors. An observed sample in the set of observed samples includes respective observed values of the multiple factors.

At block 320, the causality determining apparatus 120 (e.g., the dependency relationships determining unit 121) determines a set of dependency relationships (e.g., the skeleton graph 210 as shown in FIG. 2) between the multiple factors based on the set of observed samples. A dependency relationship in the set of dependency relationships indicates an interrelated factor pair among the multiple factors.

In some embodiments, in order to determine the set of dependency relationships, the causality determining apparatus 120 may estimate a correlation coefficient between any two factors among the multiple factors based on corresponding observed values of the two factors. For example, the correlation coefficient may be any of a Spearman correlation coefficient or a Kendall correlation coefficient. Based on the estimated correlation coefficient of every two factors, the causality determining apparatus 120 may build a correlation coefficient matrix S. For example, assuming the total number of factors is D, then S is a D×D matrix. Assuming the element at the k-th column and the j-th row in the matrix S is $S_{jk}$, then $S_{jk}$ may be determined as below:

$$S_{jk} = \begin{cases} 2\sin\left(\frac{\pi}{6}\rho_{jk}\right), & j \neq k \\ 1, & j = k \end{cases} \text{ or} \tag{1}$$

$$S_{jk} = \begin{cases} \sin\left(\frac{\pi}{2}\tau_{jk}\right), & j \neq k \\ 1, & j = k \end{cases}$$

wherein $\rho_{jk}$ denotes the Spearman correlation coefficient between the j-th factor and the k-th factor among D factors, and $\tau_{jk}$ denotes the Kendall correlation coefficient between the j-th factor and the k-th factor among D factors. Calculation of the Spearman correlation coefficient and the Kendall correlation coefficient is well known to those skilled in the art and thus is not described in detail herein. In addition, any method or means that is known or to be developed in the future may be used to calculate the correlation coefficient between two factors, rather than being limited to Spearman correlation coefficients and Kendall correlation coefficients. It should be understood that the Spearman correlation coefficient and the Kendall correlation coefficient are only considered as examples of correlation coefficients and not intended to limit the scope of the present disclosure.

In some embodiments, based on the estimated correlation coefficient matrix S, the causality determining apparatus 120 may establish an objective function (also referred to as "a first objective function" herein) for determining the set of dependency relationships (i.e., the skeleton graph 210). The causality determining apparatus 120 may determine the set of dependency relationships by minimizing the first objective function. In some embodiments, the causality determining apparatus 120 may learn a precision matrix $\Omega$, which represents respective dependency relationships between factors, based on a graphical Lasso algorithm. For example, $\Omega$ may be determined as below:

$$\Omega = \underset{\Omega \geq 0}{\operatorname{argmin}}\left\{ tr(S\Omega) - \log|\Omega| + \lambda\sum_{j \neq k}|\Omega_{jk}| \right\} \tag{2}$$

wherein $\lambda$ is a predefined coefficient. If the element $\Omega_{jk}$ at the j-th row and k-th column in the determined matrix $\Omega$ is 0, it means that the j-th factor and the k-th factor among D factors are not correlated; if the element $\Omega_{jk}$ is not 0, it means that the j-th factor and the k-th factor among D factors are interrelated (but do not necessarily have causality). Assuming the set of dependency relationships is denoted as a matrix M, then an element M in the matrix satisfies the following relationships: $M_{jk}=\Omega_{jk}\neq 0$. In this way, the causality determining apparatus 120 can determine the set of dependency relationships between the multiple factors based on the set of observed samples, as shown by the skeleton graph 210 in FIG. 2. The terms of "set of dependency relationships" and "skeleton graph" may be interchangeably used below.

Alternatively, in some embodiments, the causality determining apparatus 120 may determine the set of dependency relationships M by applying a conditional independent test on the multiple factors. The conditional independent test may be used to determine whether two factors are independent of each other under a given conditional set. In a conventional conditional independent test, when judging whether two factors are independent of each other, any combination of all other factors needs to be used as the above conditional set. When the number (i.e., D) of factors is large, the computational overhead will become huge. If the conditional set includes many other factors, then the above-mentioned two factors will be easily determined as independent of each other. In order to quickly and accurately realize high dimensional causal structure discovery, in some embodiments, when determining the set of dependency relationships by applying a conditional independent test on the multiple factors, the causality determining apparatus 120 may limit the number of other factors in the conditional set to 1. In this way, besides the computational overhead of the conditional independent test being reduced, the number of factor pairs that are judged to be independent of each other may also be reduced, which is advantageous to the subsequent discovery of the causality sequence.

In this way, by determining the set of dependency relationships, embodiments of the present disclosure can narrow down the size of variable space to be searched, so that causality between a large number of factors can be discovered quickly.

At block 330, the causality determining apparatus 120 (e.g., the causality determining unit 122) determines a causality sequence of the multiple factors based on the set of dependency relationships. The causality sequence may indicate one factor in the interrelated factor pair is the cause of the other factor in the interrelated factor pair.

In some embodiments, in order to determine the causality sequence, for multiple interrelated factor pairs indicated by the set of dependency relationships, the causality determining apparatus 120 may determine influence of one factor on the other factor in each interrelated factor pair. In some embodiments, in order to determine the influence of one factor on the other factor in each factor pair, the causality determining apparatus 120 may establish a second objective function based on a predetermined distribution (e.g., Gaussian distribution or other distribution), thereby determining the influence of one factor on the other factor in each factor pair by minimizing the second objective function. The second objective function may be, for example, established based on the following two parts: first, the discovered causal structure is made to have good data fitness to the observed data sample; second, the discovered causal structure is also made sparse.

In some embodiments, assuming the total number of factors is D, the influence determined for each of the multiple factor pairs is denoted as matrix B, which may be determined as below:

$$B = \underset{B=[\beta_1,\dots,\beta_D]}{\text{argmin}} \sum_{i=1}^{D} \log\left(\sum_{n=1}^{N} (x_{i,n} - X_{-i,n}\beta_i)^2\right) + \frac{1}{N}\log(N)|B|_0 \quad (3)$$

$$\text{s.t. } G_{\{\beta_1,\dots,\beta_D\}} \in DAG; G_{\{\beta_1,\dots,\beta_D\}} \subset M$$

wherein $X=\{x_1, x_2, \dots, x_D\}\square R^{N\times D}$ denoting the set of observed samples, N denotes the total number of observed samples in X, and D denotes the total number of factors. The vector $x_i\square R^{N}$ (wherein $1\le i\le D$) denotes N observed values of the i-th factor (i.e., factor $v_i$). $x_{i,n}$ (wherein $1\le i\le D$ and $1\le n\le N$) denotes the n-th observed value of the i-th factor. The vector $\beta_i\square R^{D-1}$ (wherein $1\le i\le D$) denotes the respective influence of each factor on the factor $v_i$. For example, if $\beta_{ij}\ne 0$, then the factor $v_j$ may be a direct cause of the factor $v_i$; if $\beta_{ij}=0$, it means that the factor $v_j$ has no influence on the factor $v_i$ and thus cannot be a direct cause of the factor $v_i$. $|B|_0$ denotes the total number of the nonzero elements in the matrix B, and is an estimate of the causal structure sparsity, and $$|B|_0 = \sum_{i=1}^{D} |\beta_i|_0.$$

The constraint condition $G_{(\beta_1, \dots, \beta_D)}\in DAG$ represents that the causal structure to be determined is a directed acyclic graph, and the constraint condition $G_{(\beta_1, \dots, \beta_D)}\subset G_{(M)}$ represents that the causal structure to be determined is a subset of the previously determined skeleton graph M (e.g., the skeleton graph 210 as shown in FIG. 2).

Figure 4:
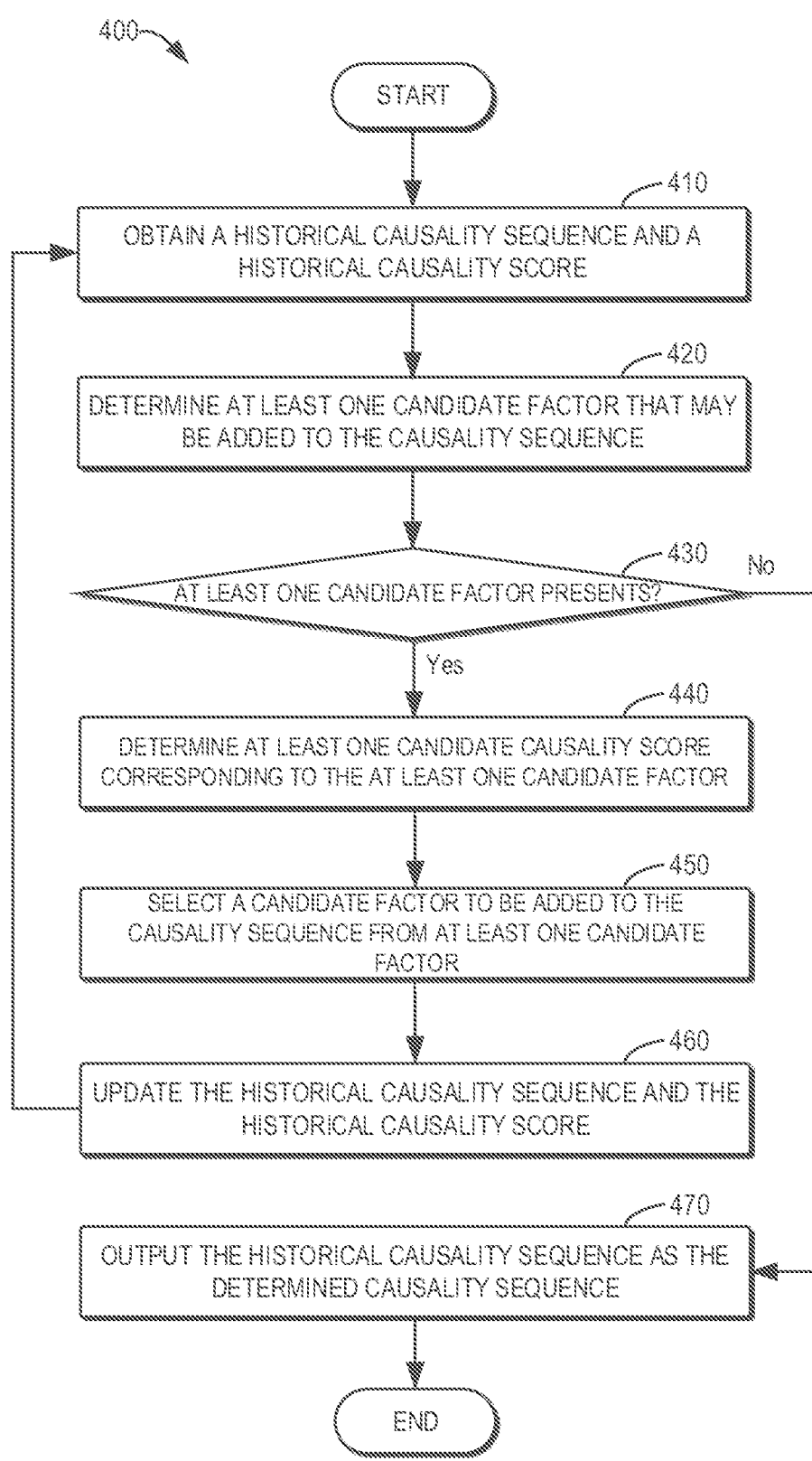
FIG. 4 shows a flowchart of an example method according to embodiments of the present disclosure.

In some embodiments, the causality determining apparatus 120 may determine the causality sequence 130 based on the set of observed samples and respective influences determined for the multiple factors. For example, FIG. 4 shows a flowchart of a method 400 for determining a causality sequence according to embodiments of the present disclosure. The method 400 may be performed by the causality determining apparatus 120 as shown in FIG. 1A. It should be understood that the method 400 may further include an additional act that is not shown and/or may omit some acts that are shown. The scope of the present disclosure is not limited in this regard.

At block 410, the causality determining apparatus 120 may obtain a historical causality sequence and a historical causality score. It is assumed herein that the historical causality sequence is denoted as $Q_S$, and the historical causality score is denoted as $f(Q_S)$.

In some embodiments, initially, the causality determining apparatus 120 may initialize the historical causality sequence to an empty sequence, i.e., $Q_S=\{ \}$. The causality determining apparatus 120 may determine an initial causality score corresponding to the empty sequence as the historical causality score. That is, $$f(Q_s) = \sum_{i=1}^{D} SBIC(v_i \mid V\backslash v_i), \text{wherein} \quad (4)$$

$$SBIC(v_i \mid V\backslash U) = \min_{\beta_i, S(\beta_i)\subseteq(V\backslash U\cap S(m_i))} BIC(\beta_i, X_i, X_{-i}) \text{ and}$$

$$BIC(\beta_i, X_i, X_{-i}) = \log\left(\sum_{n=1}^{N} (x_{i,n} - X_{-i,n}\beta_i)^2 + \frac{1}{N}\log(N)|\beta_i|_0\right)$$

In equation (4), it is assumed that the causality sequence is represented by the directed acyclic graph G={V,E}, wherein V represents a set of all the nodes (e.g., all the nodes with edges in the skeleton graph 210) in the graph G, and E represents a set of all edges in the graph G For example, in the example as shown in FIG. 2, $V=\{v_1, v_2, v_3, v_4, v_5\}$. V\U represents all the nodes in the set V except the nodes in set U (i.e., V\$v_i$ denotes all nodes except $v_i$). $S(\beta_i)$ represents a support set of $\beta_i$, i.e., a set of parent nodes (i.e., nodes representing potential causes of the factor $v_i$) of the node $v_i$. The constraint condition $S(\beta_i)\subseteq(V\backslash U\cap S(m_i))$ represents that the set $S(\beta_i)$ is a subset of the intersection of the set V\U and the set $S(m_i)$, wherein the set $S(m_i)$ represents a set of nodes having edges with node $v_i$ in the skeleton graph (e.g., the skeleton graph 120). For example, in the example as shown in FIG. 2, $f(Q_S)=f(\{ \})=SBIC(v_1|v_2)+SBIC(v_2|(v_1, v_4))+SBIC(v_3|(v_4, v_5))+SBIC(v_4|(v_2, v_3))+SBIC(v_5|v_3)$.

At block 420, the causality determining apparatus 120 determines one or more candidate factors that may be added to the causality sequence, based on the historical causality sequence $Q_S$ and the multiple factor pairs indicated by the set of dependency relationships (e.g., the skeleton graph 210). In some embodiments, the one or more candidate factors may include all factors corresponding to a candidate node set $V\backslash Q_S$, which may represent all nodes in the node set V except nodes included in $Q_s$.

If the one or more candidate factors is absent (i.e., the set $V\backslash Q_S$ is empty), then at block 470, the causality determining apparatus 120 may output the historical causality sequence $Q_S$ as the determined causality sequence 130.

If the one or more candidate factors present, then at block 440, the causality determining apparatus 120 may determine one or more candidate causality scores corresponding to the one or more candidate factors. For example, for each candidate node $v_i$ in the candidate node set $V\backslash Q_S$ (i.e., $v_i \in V\backslash Q_S$), the corresponding candidate causality sequence is $Q_S'=Q_S \cup v_i$, and a score of the candidate causality sequence is $f(Q_S')=f(Q_S)+SBIC(v_i|Q_S)-SBIC(v_i|V\backslash v_i)$.

At block 450, the causality determining apparatus 120 may select a candidate factor to be added to the causality sequence from one or more candidate factors based on the determined one or more candidate causality scores.

In some embodiments, the causality determining apparatus 120 may determine the minimum candidate causality score from the one or more candidate causality scores and select a candidate factor associated with the minimum candidate causality score so as to add the selected candidate factor to the causality sequence 130.

Additionally or alternatively, in some embodiments, in order to determine the causality sequence more quickly, the causality determining apparatus 120 may obtain a constraint condition associated with the to-be-determined causality sequence.

In some embodiments, the causality determining apparatus 120 may obtain expert knowledge indicating the constraint condition and determine the constraint condition based on the obtained expert knowledge. By taking the example shown in FIG. 2 as an example, the expert knowledge may, for example, indicate that the node $v_3$ is in front of the node $v_4$, i.e., a factor corresponding to the node $v_3$ may be the cause of a factor corresponding to the node $v_4$, but the factor corresponding to the node $v_4$ cannot be the cause of the factor corresponding to the node $v_3$.

Additionally or alternatively, in some embodiments, the causality determining apparatus 120 may determine the constraint condition based on the historical causality sequence and multiple interrelated factor pairs indicated by the skeleton graph 120. For example, in the example as shown in FIG. 2, assuming current $Q_S$ indicates that the factor corresponding to the node $v_3$ is the cause of the factor corresponding to the node $v_4$ (i.e., there is an edge $v_3 \rightarrow v_4$ in the causality sequence 130). In addition, according to the skeleton graph M, it may be determined that the nodes $v_1$ and $v_2$ are interrelated, the nodes $v_3$ and $v_4$ are interrelated, the factors $v_3$ and $v_4$ are interrelated, and the factors $v_3$ and $v_5$ are interrelated. Therefore, the nodes $v_1$, $v_2$ and $v_4$ form a set of strongly connected nodes, and the nodes $v_3$ and $v_5$ form a set of strongly connected nodes. In this case, for example, the causality determining apparatus 120 may determine that the node set $\{v_3, v_5\}$ is in front of the node set $\{v_1, v_2, v_4\}$. That is, a certain node in the node set $\{v_3, v_5\}$ may be the cause of a certain node in the node set $\{v_1, v_2, v_4\}$, but any node in the node set $\{v_1, v_2, v_4\}$ cannot be the cause of a certain node in the node set $\{v_3, v_5\}$.

In some embodiments, in response to obtaining the constraint condition associated with the to-be-determined causality sequence, the causality determining apparatus 120 may select a candidate factor to be added to the causality sequence from one or more candidate factors, so that the addition of the selected candidate factor conforms to the acquired constraint condition. For example, when the addition of the candidate factor associated with the minimum candidate causality score will violate the constraint condition, the causality determining apparatus 120 may select another candidate factor (e.g., a candidate factor associated with the second minimum candidate causality score) so as to add it to the causality sequence 130.

In this way, with the constraint condition, the number of candidate factors can be limited during the determining process of the causality sequence, and thereby the causality sequence can be determined more quickly.

At block 460, in response to the candidate factor being selected, the causality determining apparatus 120 may update the historical causality sequence $Q_S$ and the historical causality score $f(Q_S)$. For example, the causality determining apparatus 120 may replace the historical causality sequence $Q_S$ with a candidate causality sequence $Q_S'$ corresponding to the selected candidate factor, and replace the historical causality score $f(Q_S)$ with a score $f(Q_S')$ corresponding to the candidate causality sequence $Q_S'$.

In some embodiments, the causality determining apparatus 120 may iteratively perform operations in blocks 410 to 460 in the method 400, until all possible candidate factors have been searched (i.e., performing operations at block 470).

FIG. 5 shows a flowchart of a method 500 for affecting an observed value of a target factor according to embodiments of the present disclosure. For example, the method 500 may be performed by the observed sample affecting apparatus 140 as shown in FIG. 1B. In some embodiments, the method 500 may be performed following the method 300. It should be understood that the method 500 may further include an additional act that is not shown and/or may omit some acts that are shown. The scope of the present disclosure is not limited in this regard.

At block 510, the observed sample affecting apparatus 140 determines at least one factor as the cause of the target factor from the multiple factors based on the causality sequence. At block 520, the observed sample affecting apparatus 140 affects an observed value of the target factor by changing an observed value of the at least one factor. In some embodiments, for example, the observed sample affecting apparatus 140 may affect the observed value of the target factor by affecting and changing the at least one factor and/or formulating a corresponding policy for the at least one factor.

Take the above-mentioned scenario of customer satisfaction with telecom operators as an example. The target factor is "customer satisfaction". Based on the causality sequence 130, the observed sample affecting apparatus 140 may determine which factors (for example, the reminder before the package runs out, favorable package, etc.) are the causes of the target factor of "customer satisfaction". The observed sample affecting apparatus 140 may further improve customer satisfaction with telecom operators by affecting and changing these factors and/or formulating corresponding policies (for example, providing more reminders to customers before the package runs out, providing more favorable packages to customers) for these factors.

Take the above-mentioned scenario about the blood pressure of a patient as an example. The target factor is "blood pressure". Based on the causality sequence 130, the observed sample affecting apparatus 140 may determine which physiological indicators are the causes of the target factor of "blood pressure". The observed sample affecting apparatus 140 may further keep the blood pressure of the patient stable by affecting and changing these physiological indicators and/or formulating corresponding policies for these physiological indicators.

Take the above-mentioned scenario about commodity sales as an example. The target factor is "sales volume of umbrellas". Based on the causality sequence 130, the observed sample affecting apparatus 140 may determine which factors (for example, weather, the number of umbrellas available for sale) are the causes of the target factor of "sales volume of umbrellas". The observed sample affecting apparatus 140 may further increase the sales volume of the target commodity umbrellas by affecting and changing these factors and/or formulating corresponding policies (for example, increasing the number of umbrellas available for sale during raining) for these factors.

Take the above-mentioned scenario about software development as an example. The target factor is "software development cycle". Based on the causality sequence 130, the observed sample affecting apparatus 140 may determine which factors (for example, the number of architecture level, programming language, etc.) are the causes of the target factor of "development cycle". The observed sample affecting apparatus 140 may further reduce the software development cycle by affecting and changing these factors and/or formulating corresponding policies (for example, reducing the software architecture complexity, using more-friendly programming language, etc.) for these factors. For another example, the target factor may be "software failure rate of running phase". Based on the causality sequence 130, the observed sample affecting apparatus 140 may determine which factors (for example, code length, the number of modules, etc.) are the causes of the target factor of "software failure rate of running phase". The observed sample affecting apparatus 140 may further reduce the software failure rate of running phase by affecting and changing these factors and/or formulating corresponding policies (for example, reducing the code length, reducing the number of modules, etc.) for these factors.

FIG. 6 shows a flowchart of a method 600 for optimizing causality according to embodiments of the present disclosure. For example, the method 600 may be performed by the causality optimizing apparatus 160 as shown in FIG. 1B. In some embodiments, the method 600 may be performed following the method 500. It should be understood that the method 600 may further include an additional act that is not shown and/or may omit some acts that are shown. The scope of the present disclosure is not limited in this regard.

At block 610, the causality optimizing apparatus 160 obtains a changed set of observed samples related to the multiple factors. In some embodiments, at least one observed sample in the changed set of observed samples includes a changed observed value of at least one factor (e.g., the at least one factor is a cause of the target factor). At block 620, the causality optimizing apparatus 160 may optimize the causality sequence based on the changed set of observed samples. In some embodiments, the causality optimizing apparatus 160 may re-discover causality between the multiple factors based on the changed set of observed samples 150, e.g., by implementing similar process performed by the causality determining apparatus 120, thereby obtaining the optimized causality sequence. In this way, embodiments of the present disclosure can further improve the accuracy and robustness of causal discovery.

Figure 7:
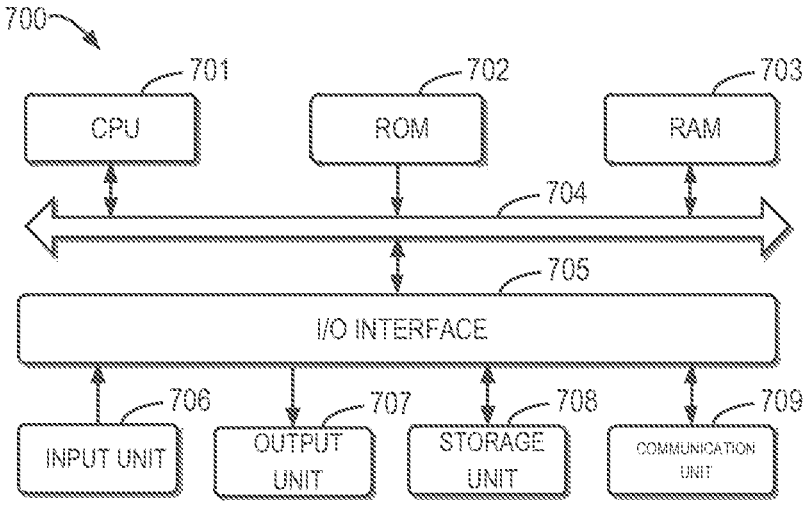
FIG. 7 shows a schematic block diagram of an example device which is applicable to implement embodiments of the present disclosure.

FIG. 7 shows a schematic block diagram of an example device 700 suitable for implementing embodiments of the present disclosure. For example, the causality determining apparatus as shown in FIG. 1A, the observed sample affecting apparatus 140 and/or the causality optimizing apparatus 160 as shown in FIG. 1B may be implemented by the device 700. As depicted, the device 700 includes a central processing unit (CPU) 701 which is capable of performing various appropriate actions and processes in accordance with computer program instructions stored in a read only memory (ROM) 702 or computer program instructions loaded from a storage unit 708 to a random access memory (RAM) 703. Various programs and data required by the device 700 when operating can be stored in RAM 703. The CPU 701, the ROM 702, and the RAM 703 are connected to each other via a bus 704. An input/output (I/O) interface 705 is also connected to the bus 704.

Multiple components in the device 700 are connected to the I/O interface 705: an input unit 706 including a keyboard, a mouse, or the like; an output unit 707, such as various types of displays, a loudspeaker or the like; a storage unit 708, such as a disk, an optical disk or the like; and a communication unit 709, such as a LAN card, a modem, a wireless communication transceiver or the like. The communication unit 709 allows the device 700 to exchange information/data with other devices via a computer network, such as the Internet, and/or various telecommunication networks.

The above-described procedures and processes, such as the methods 300, 400, 500 and/or 600, may be executed by the processing unit 701. For example, in some embodiments, the methods 300, 400, 500 and/or 600 may be implemented as a computer software program, which is tangibly embodied on a machine readable medium, e.g. the storage unit 708. In some embodiments, part or the entirety of the computer program may be loaded to and/or installed on the device 700 via the ROM 702 and/or the communication unit 709. The computer program, when loaded to the RAM 703 and executed by the CPU 701, may execute one or more acts of the methods 300, 400, 500 and/or 600 as described above.

The present disclosure may be a method, an apparatus, a system, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to embodiments disclosed. Many modifications and variations will be apparent to those of ordinary skill in the art without departing from the scope and spirit of the described embodiments. The terminology used herein was chosen to best explain the principles of embodiments, the practical application or technical improvement over technologies found in the marketplace, or to enable others of ordinary skill in the art to understand embodiments disclosed herein.

We claim:

1. A method for data processing, the method performed by an apparatus for data processing and comprising:

obtaining a set of observed samples related to a plurality of factors, an observed sample in the set of observed samples comprising respective observed values of the plurality of factors;

determining a set of dependency relationships between the plurality of factors based on the set of observed samples, a dependency relationship in the set of dependency relationships indicating an interrelated factor pair among the plurality of factors; and determining a causality sequence of the plurality of factors based on the set of dependency relationships, the causality sequence indicating that one factor in the interrelated factor pair is a cause of the other factor in the interrelated factor pair, wherein the determining the set of dependency relationships comprises determining the set of dependency relationships by applying a conditional independent test to the plurality of factors, wherein the applying the conditional independent test to the plurality of factors comprises determining whether any two factors of the plurality of factors are independent of each other under a conditional set, the number of other factors of the plurality of factors in the conditional set being limited to 1.

2. The method of claim 1, wherein the plurality of factors comprise a target factor, and the method further comprises:

determining, based on the causality sequence, at least one factor as a cause of the target factor from the plurality of factors; and affecting an observed value of the target factor by changing an observed value of the at least one factor.

3. The method of claim 2, further comprising:

obtaining a changed set of observed samples related to the plurality of factors, at least one observed sample in the changed set of observed samples comprising a changed observed value of the at least one factor; and optimizing the causality sequence based on the changed set of observed samples.

4. The method of claim 1, wherein determining the set of dependency relationships further comprises:

for the two factors of the plurality of factors, estimating a correlation coefficient between the two factors based on respective observed values of the two factors in the set of observed samples;

establishing, based on a result of the estimation, a first objective function for determining the set of dependency relationships; and determining the set of dependency relationships by minimizing the first objective function.

5. The method of claim 4, wherein the correlation coefficient comprises any of:

a Spearman correlation coefficient, or a Kendall correlation coefficient.

6. The method of claim 1, wherein determining the causality sequence comprises:

for a plurality of interrelated factor pairs indicated by the set of dependency relationships, determining an influence of one factor on the other factor in each of the plurality of interrelated factor pairs; and determining the causality sequence based on the set of observed samples and respective influences determined for the plurality of factors.

7. The method of claim 6, wherein the determining the influence of one factor on the other factor in each of the plurality of interrelated factor pairs comprises:

establishing, based on a predetermined distribution, a second objective function for determining the respective influences for the plurality of factors; and determining the influence of one factor on the other factor in each of the plurality of interrelated factor pairs by minimizing the second objective function.

8. The method of claim 7, wherein the predetermined distribution comprises a Gaussian distribution.

9. The method of claim 6, wherein determining the causality sequence comprises iteratively performing the following operations at least once:

obtaining a historical causality sequence and a historical causality score corresponding to the historical causality sequence;

determining one or more candidate factors that may be added to the causality sequence based on the historical causality sequence and the plurality of interrelated factor pairs;

in response to presence of the one or more candidate factors, determining one or more candidate causality scores corresponding to the one or more candidate factors based on the historical causality score, the set of observed samples, and the respective influences determined for the plurality of factors;

selecting a candidate factor to be added to the causality sequence from the one or more candidate factors based on the one or more candidate causality scores; and updating the historical causality sequence and the historical causality score based on the selected candidate factor.

10. The method of claim 9, further comprising:

determining the historical causality sequence as the causality sequence in response to absence of the one or more candidate factors.

11. The method of claim 9, wherein obtaining the historical causality sequence and the historical causality score comprises:

initializing the historical causality sequence to an empty sequence; and determining an initial causality score corresponding to the empty sequence as the historical causality score.

12. The method of claim 9, wherein selecting the candidate factor from the one or more candidate factors comprises:

determining a minimum candidate causality score from the one or more candidate causality scores; and selecting the candidate factor associated with the minimum candidate causality score from the one or more candidate factors.

13. The method of claim 9, wherein selecting the candidate factor from the one or more candidate factors comprises:

obtaining a constraint condition associated with the causality sequence to be determined; and selecting the candidate factor to be added to the causality sequence from the one or more candidate factors such that the addition of the candidate factor conforms to the constraint condition.

14. The method of claim 13, wherein obtaining the constraint condition comprises:

obtaining information indicating the constraint condition; and determining the constraint condition based on the information.

15. The method of claim 13, wherein obtaining the constraint condition comprises:

determining the constraint condition based on the historical causality sequence and the plurality of interrelated factor pairs.

16. An apparatus for data processing, comprising:

at least one processing unit; and at least one memory coupled to the at least one processing unit and storing instructions executable by the at least one processing unit, the instructions, when executed by the at least one processing unit, causing the apparatus to perform acts comprising:

obtaining a set of observed samples related to a plurality of factors, an observed sample in the set of observed samples comprising respective observed values of the plurality of factors;

determining a set of dependency relationships between the plurality of factors based on the set of observed samples, a dependency relationship in the set of dependency relationships indicating an interrelated factor pair among the plurality of factors; and determining a causality sequence of the plurality of factors based on the set of dependency relationships, the causality sequence indicating that one factor in the interrelated factor pair is a cause of the other factor in the interrelated factor pair, wherein the determining the set of dependency relationships comprises determining the set of dependency relationships by applying a conditional independent test to the plurality of factors, wherein the applying the conditional independent test to the plurality of factors comprises determining whether any two factors of the plurality of factors are independent of each other under a conditional set, the number of other factors of the plurality of factors in the conditional set being limited to 1.

17. The apparatus of claim 16, wherein the plurality of factors comprise a target factor, and wherein the acts further comprise:

determining, based on the causality sequence, at least one factor as a cause of the target factor from the plurality of factors; and affecting an observed value of the target factor by changing an observed value of the at least one factor.

18. The apparatus of claim 17, wherein the acts further comprise:

obtaining a changed set of observed samples related to the plurality of factors, at least one observed sample in the changed set of observed samples comprising a changed observed value of the at least one factor; and optimizing the causality sequence based on the changed set of observed samples.

19. A computer-readable storage medium having machine-executable instructions stored thereon which, when being executed by a device, cause the device to perform a method comprising:

obtaining a set of observed samples related to a plurality of factors, an observed sample in the set of observed samples comprising respective observed values of the plurality of factors;

determining a set of dependency relationships between the plurality of factors based on the set of observed samples, a dependency relationship in the set of dependency relationships indicating an interrelated factor pair among the plurality of factors; and determining a causality sequence of the plurality of factors based on the set of dependency relationships, the causality sequence indicating that one factor in the interrelated factor pair is a cause of the other factor in the interrelated factor pair, wherein the determining the set of dependency relationships comprises determining the set of dependency relationships by applying a conditional independent test to the plurality of factors, wherein the applying the conditional independent test to the plurality of factors comprises determining whether any two factors of the plurality of factors are independent of each other under a conditional set, the number of other factors of the plurality of factors in the conditional set being limited to 1.

* * * * *